C. R. EMENS & W. A. BROWER.
MACHINE FOR MAKING TOOTHPICKS.
APPLICATION FILED JULY 29, 1907.

907,979.

Patented Dec. 29, 1908.
5 SHEETS—SHEET 2.

Witnesses

Inventors
Charles R. Emens
Willis A. Brower

By

Attorneys

C. R. EMENS & W. A. BROWER.
MACHINE FOR MAKING TOOTHPICKS.
APPLICATION FILED JULY 29, 1907.

907,979.

Patented Dec. 29, 1908.

5 SHEETS—SHEET 3.

Witnesses
O. B. Baenziger
J. G. Howlett

Inventors
Charles R. Emens
Willis A. Brower
by T. A. Wheeler & Co.
Attorneys

C. R. EMENS & W. A. BROWER.
MACHINE FOR MAKING TOOTHPICKS.
APPLICATION FILED JULY 29, 1907.

907,979.

Patented Dec. 29, 1908.
5 SHEETS—SHEET 4.

Witnesses
Q. B. Baenziger.
J. G. Howlett.

Inventors.
Charles R. Emens.
Willis A. Brower.
By T. A. Wheeler & Co.
Attorneys

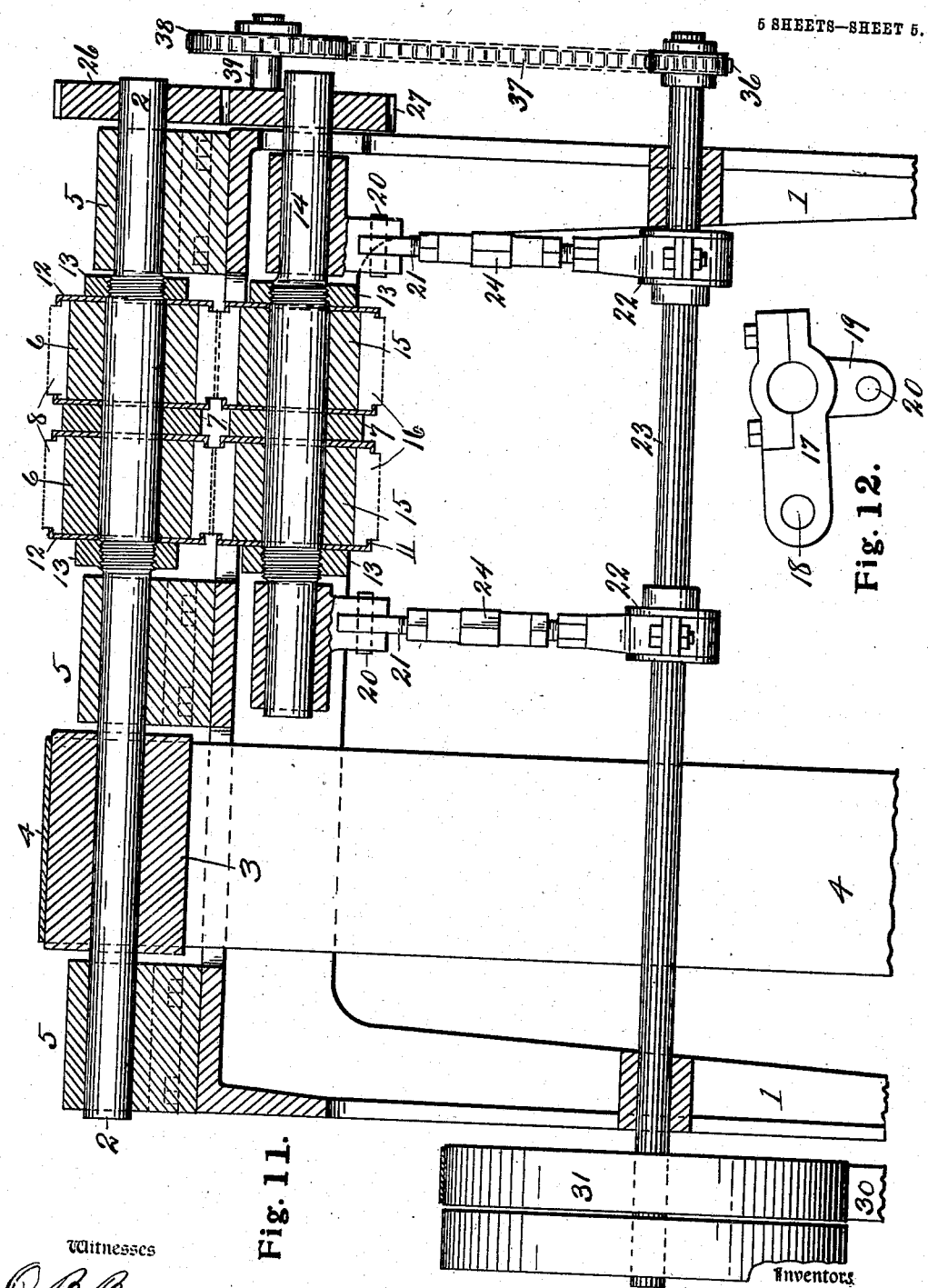

UNITED STATES PATENT OFFICE.

CHARLES R. EMENS AND WILLIS A. BROWER, OF ADRIAN, MICHIGAN, ASSIGNORS TO GEM TOOTHPICK COMPANY, OF ADRIAN, MICHIGAN, A CORPORATION OF MICHIGAN.

MACHINE FOR MAKING TOOTHPICKS.

No. 907,979.     Specification of Letters Patent.     Patented Dec. 29, 1908.

Application filed July 29, 1907. Serial No. 386,038.

*To all whom it may concern:*

Be it known that we, CHARLES R. EMENS and WILLIS A. BROWER, citizens of the United States, residing at Adrian, in the county of Lenawee, State of Michigan, have invented certain new and useful Improvements in Machines for Making Toothpicks; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for making toothpicks and analogous articles, and consists in the construction and arrangement of parts hereinafter fully set forth and pointed out particularly in the claims.

The object of the invention is to provide a machine of the character described of comparatively simple and inexpensive construction, wherein tooth-picks may be rapidly and perfectly made, the arrangement being such that a strip of wood of the proper size may be fed into the machine and converted into tooth-picks which are removed from the machine as rapidly as formed.

The above object is attained by the mechanism illustrated in the accompanying drawings, in which:—

Figure 1:
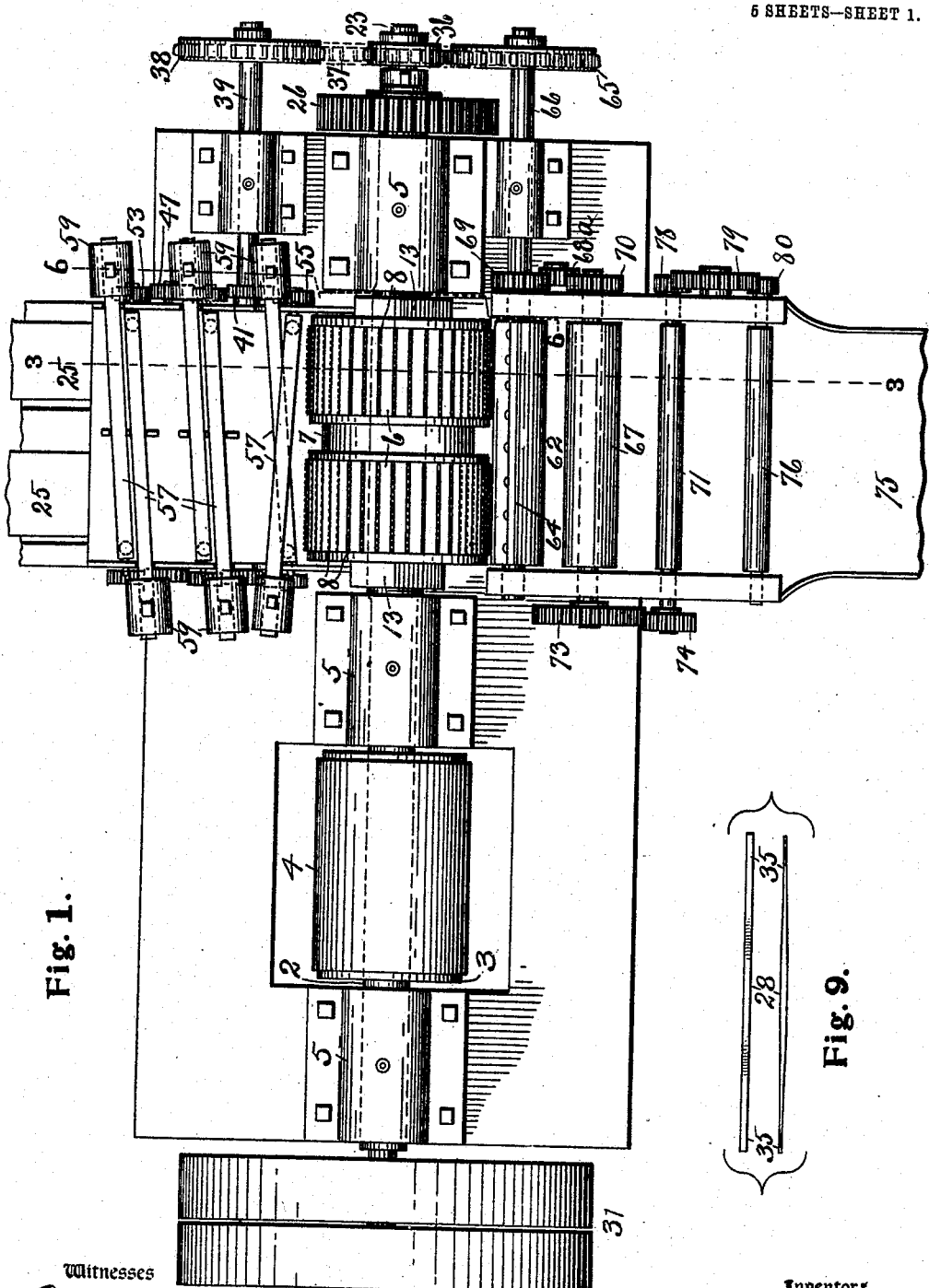
Figure 2:
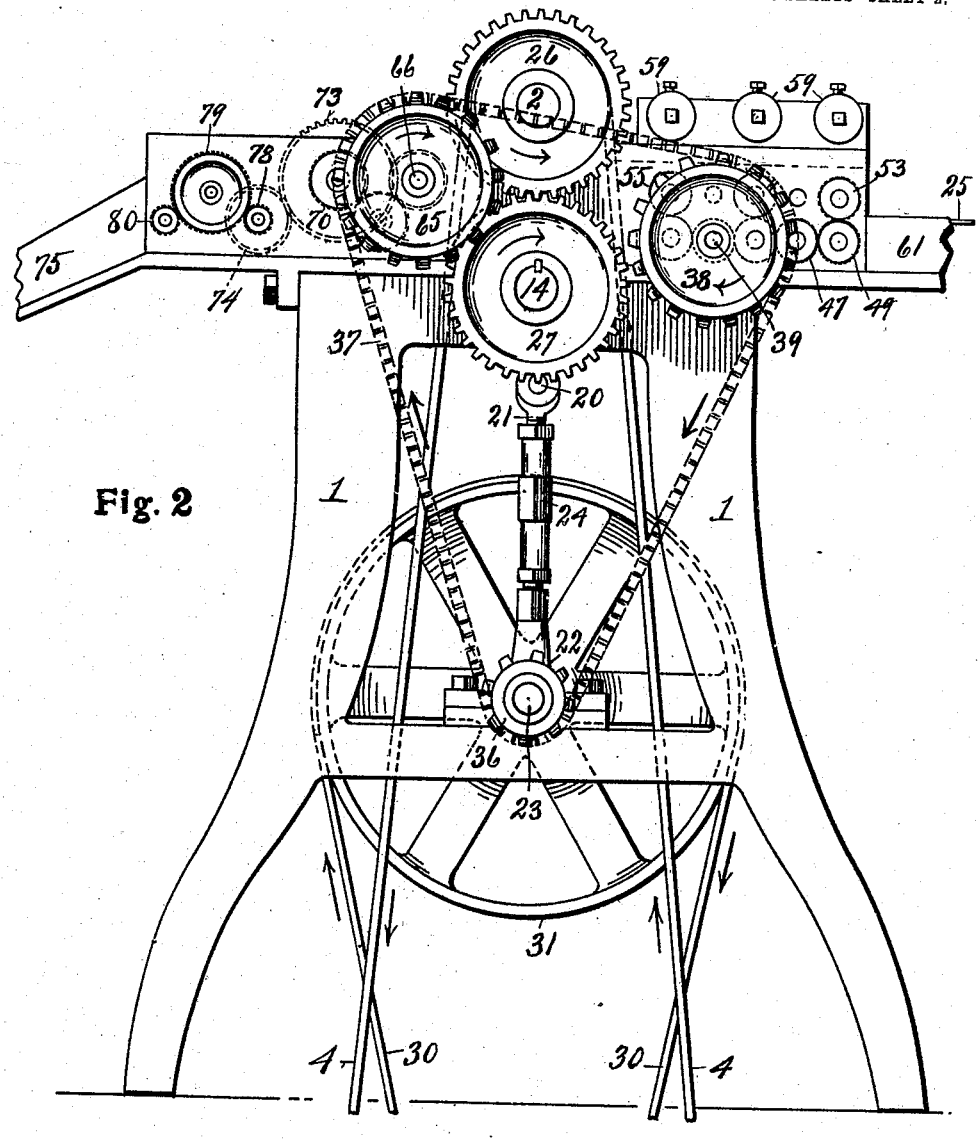
Figure 10:
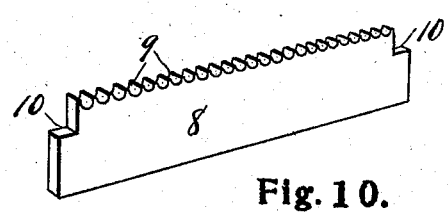
Figure 3:
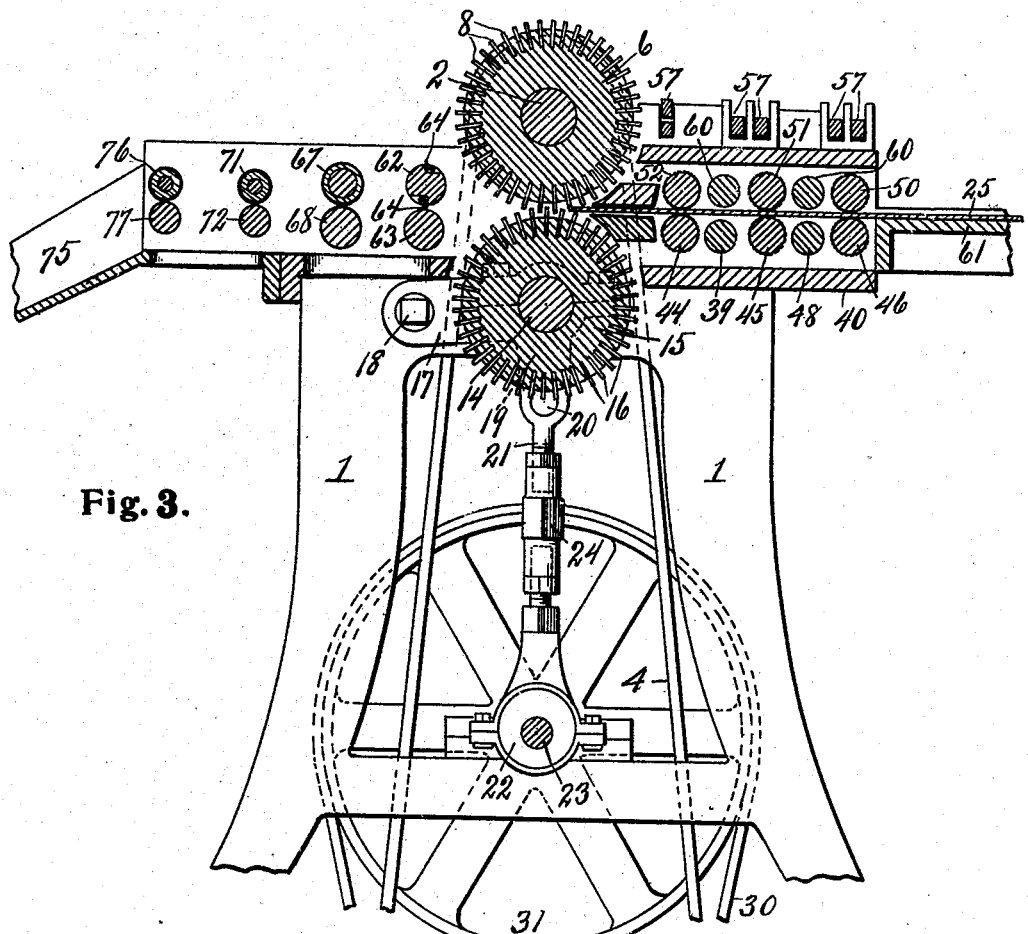
Figure 4:
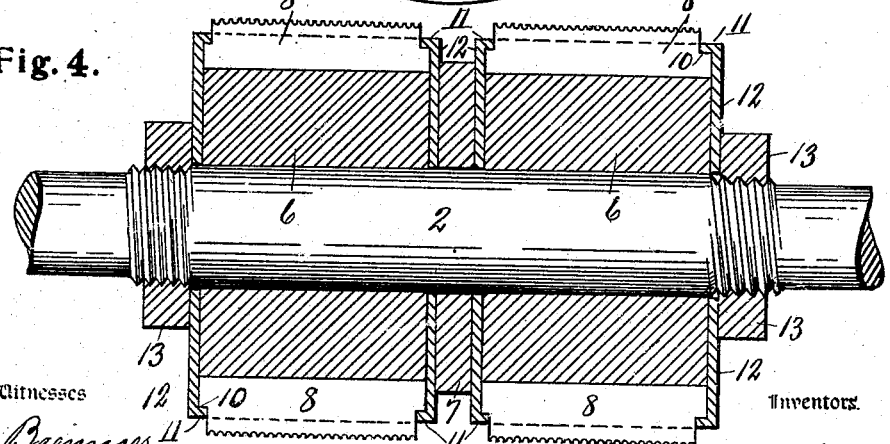
Figure 5:
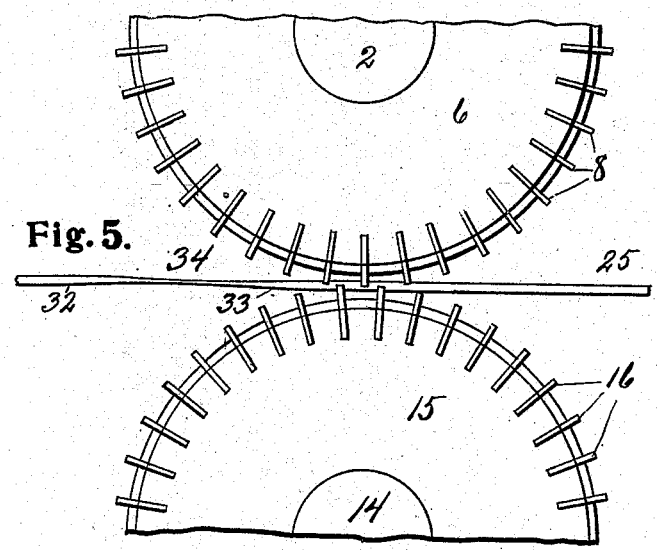
Figure 8:
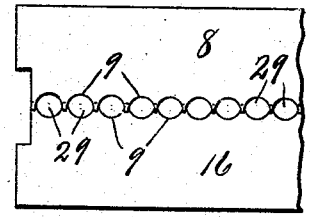
Figure 6:
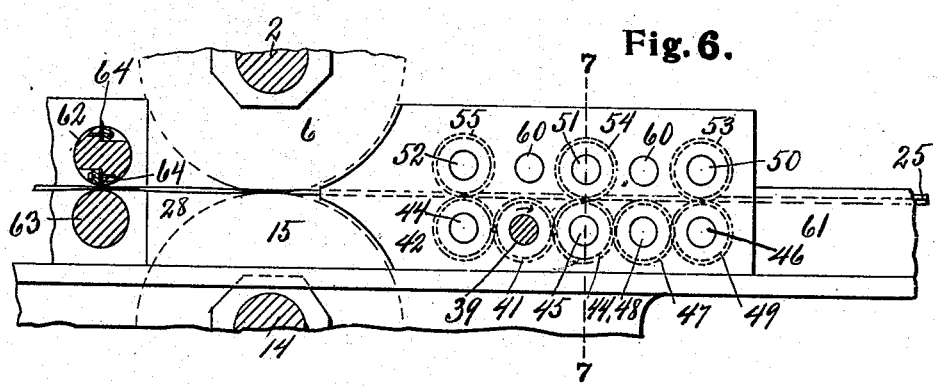
Figure 7:
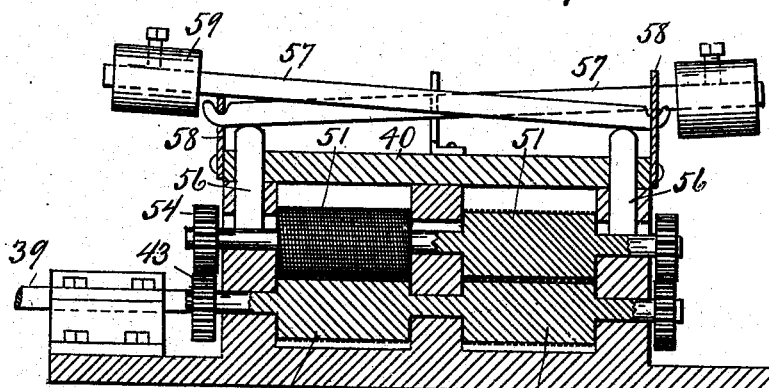

Figure 1 is a plan view of a machine embodying our invention. Fig. 2 is a side elevation thereof. Fig. 3 is a longitudinal section as on line 3—3 of Fig. 1. Fig. 4 is a transverse section through the rotary heads carrying the cutting knives, said section being parallel with the axis of the arbor on which the heads are mounted. Fig. 5 is a fragmentary view in end elevation of an upper and lower head in which the cutters or knives are mounted, showing the passage of a strip of wood between the knives of said heads and the conversion of said strip into picks. Fig. 6 is a sectional view as on line 6—6 of Fig. 1. Fig. 7 is a transverse section through the feeding rollers as on line 7—7 of Fig. 6. Fig. 8 is a fragmentary view in elevation of an upper and a lower knife as positioned in the cutter heads, showing the formation of said knives which gives shape to the tooth-picks. Fig. 9 is a view showing two elevations of the completed pick. Fig. 10 is a perspective view of one of the knives.

Fig. 11 is a longitudinal section parallel with the main shaft and at right angles to Fig. 3. Fig. 12 is an elevation of one of the hinged bearings in which the reciprocatory shaft is mounted.

Referring to the characters of reference, 1 designates a suitable frame in which the mechanism is mounted. Journaled on the bed of the machine is the main shaft or arbor 2 carrying a relatively small belt pulley 3 over which passes a belt 4, from any suitable source of power. It is designed that the shaft or arbor 2 shall turn at a high rate of speed and is accordingly provided with suitable bearings 5.

We have herein illustrated a machine provided with two sets of heads and cutters and other parts to enable two strips of wood to be fed into the machine at a time. It is evident, however, that any number of sets of heads may be employed without departing from the spirit of our invention.

On referring to Fig. 4, it will be seen that upon shaft 2 are mounted two heads 6 separated by a dividing collar 7. These heads are fixed to the shaft and are annular in form, being provided in their peripheries with transverse channels in which are set the knives 8 which stand radially of said heads and are closely associated. The edges of said knives, as will be clearly seen on referring to Fig. 10, are provided with U-shaped teeth or cutters 9 which give shape to the tooth-picks. The ends of the knives are provided with the projecting shoulders 10 and are adapted to be engaged by the inwardly extending flanges 11 on the circular disks 12 that embrace the ends of the heads, as shown in Fig. 4, and are confined in place by the nuts 13 screwed onto the shaft 2 against the outer disks to lock said parts together and to the shaft and firmly secure the knives in the heads in a manner to enable them to be readily removed. Crossing the bed of the machine on the under side thereof parallel with the shaft 2, is a second shaft 14 carrying the lower set of heads 15 in which are secured the knives 16 in the same manner that the knives 8 are secured in the heads 6. The shaft 14 is mounted at its ends in boxes 17 which are hinged at 18 to the frame. Each of said boxes is provided with a depending portion 19 to which is pivotally coupled at 20 the upper end of a connecting rod 21. Each connecting rod is suitably coupled at its lower end to an eccentric 22 on the shaft 23 journaled in the lower portion of the frame. In the center of each of the connecting rods is a turn-buckle 24 for the purpose of adjustment. It will be noted that by means of this arrangement, a rotation of the shaft 23 will impart a slight vertical reciprocation to the shaft 14 carrying the lower heads, causing the knives therein to approach and recede with respect to the knives in the upper heads 6, for purposes hereinafter explained.

On referring to Fig. 5, it will be seen that the knives in the upper and lower heads 6 and 15 are so positioned that their cutting edges are interjacent when acting upon the stock strip 25, from which the picks are formed. This relative position of the knives in said heads is maintained by means of the meshing gear wheels 26 and 27 mounted upon the shafts 2 and 14 respectively, carrying said heads, an arrangement whereby shaft 14 is driven from shaft 2 in a manner to prevent any change of the relative position of the cutter carrying heads thereon. By reason of the interjacence of the knives in the upper and lower heads when acting upon the stock strip in the formation of tooth-picks, the opposed knives are prevented encountering each other as the heads revolve and the projecting points of said knives in each head between the U-shaped concavities thereof, are allowed to intersect the curve of the circle described by the points of the knives in the opposed head, enabling said points, because of the interspacing of said knives to cut through the stock strip from opposite sides and sever said strips into narrow strands of rounded formation, at the central portion of the completed pick 28, as shown in Fig. 9. The interjacence of the cutting edges of the knives in the opposed heads is such as to cause a registration of the U-shaped openings 9 thereof to form guiding channels 29, as clearly shown in Fig. 8, in which the strands of the picks lie, and which in effect guide said strands in their passage between the knives. It will be understood that the margins only of the U-shaped openings in the knives do the cutting, while the heels of the cutting edges after the material has been cut away to give the proper shape to the strands or picks, serve as bearings that support the picks between the knives while being acted on thereby.

To give the proper taper to the picks, th shaft carrying the lower heads is caused to reciprocate vertically, which reciprocation is accomplished through the rotation of the shaft 23 by means of a belt 30 passing over a pulley 31 on said shaft, whereby through the medium of the eccentrics 22, the shaft 14 carrying the lower heads is made to swing upon the hinged or pivotal points 18 of the boxes thereof and cause the knives 16 in said heads to gradually approach the knives 8 in the heads 6 and to gradually recede therefrom. As the knives in the lower heads are caused to approach the knives in the upper heads, the picks are gradually tapered at one end, as shown at 32, and as said lower knives are caused to recede from the upper knives, the required taper at the opposite ends of the picks is formed, as shown at 33. As the knives in the movable lower heads approach or pass between the upper knives, the effect is to reduce the vertical area of the openings 29 formed by the registering U-shaped formations of the cutting edges of said knives, thereby tapering the upper and lower sides of the picks, but leaving each series of picks connected by a very thin portion of the strand, as shown at 34. The transverse area of the openings 29 formed by the registering U-shaped knives in the opposed heads is not materially reduced by the approach of said knives, thereby giving to the ends of the picks a flat formation as they are tapered, as shown at 35 in Fig. 9.

In order to form picks of the proper length, it is necessary that the reciprocatory movement of the lower heads which effects the tapering of the picks, shall be made coincident with the feeding of the stock strips into the machine, so that a certain length of strip may be fed during each reciprocatory movement of the lower heads. To accomplish this coincident feeding of the stock strips with the reciprocatory movement of the heads carrying the lower knives which effect the tapering of the picks, the shaft 23 carrying the eccentrics which cause the reciprocation of said heads, is provided on the projecting end thereof with a sprocket wheel 36 over which passes a sprocket chain 37 that leads to a sprocket wheel 38 on the shaft 39. This shaft 39 crosses transversely the housing 40 in which the feed rollers are journaled, and carries thereon a gear wheel 41 which meshes with the gear wheels 42 and 43 on the lower feed rollers 44 and 45 respectively, thereby driving said feed rollers in unison in the same direction. To transmit movement from the feed roller 45 to feed roller 46, an idle pinion 47 is mounted on the transverse shaft 48 which meshes with the gear 43 and with the gear 49 on the end of feed roller 46, thereby driving said last-mentioned feed roller in unison with the feed rollers 44 and 45. It is necessary that the stock strip 25 which is fed into the machine be engaged by feed rollers above as well as below, and to accomplish that result feed rollers 50, 51 and 52 are journaled in said housing above the respective feed rollers 44, 45 and 46, and are caused to turn in unison therewith by means of the gear wheels 53, 54 and 55, which mesh respectively with the gear wheels 49, 43 and 42, thereby connecting said feed rollers in pairs so as to cause them to turn in unison. It will be noted that the surfaces of the feed rollers are serrated so as to prevent the slipping of the stock strip while being fed into the machine.

It will be noted on referring to Fig. 7 that the shafts of the upper feed rollers are vertically movable and that bearing upon the opposite ends of said shafts are the vertical pins 56 which are mounted to slide vertically and whose ends extend through the top of the housing 40. To apply sufficient weight to the opposite ends of the upper rollers so as to keep said rollers always in yielding contact with the stock strips which are fed into the machine, and afford sufficient traction to feed said strip against the action of the knives, the arms 57 are employed which cross the housing 40 from opposite sides, one end of each of which is engaged in an aperture in a vertical stud 58 secured to said housing, and said arms near their engagement with said studs, resting upon the upper ends of the pins 56, and carrying at their outer ends the adjustable weights 59, whereby the proper pressure may be applied to the upper feed rollers, by adjusting said weights on said arms, as will be well understood.

Between the upper horizontal row of feed rollers are the transverse shafts 60 which together with the lower opposed shafts 39 and 48 assist in directing the stock strips through the feed rollers. Projecting from the forward end of the housing 40 is a table 61 on a plane with the peripheries of the lower feed rollers on which the stock strip is placed prior to being introduced between said rollers. It will now be understood that because of the sprocket chain connection between the shaft 23, which causes a reciprocation of the lower cutter heads, and the feeding rollers which carry the stock strips into the machine, a reciprocation of the lower cutter heads may be caused to occur for a given length of the stock strip which is fed into the machine by said rollers, thereby determining the length of the picks that are formed and enabling picks to be made of any desired length.

To provide for severing the picks at the point 34 (see Fig. 5) between the tapered ends thereof, the rollers 62 and 63 are employed between which the formed picks pass after leaving the forming knives. Set in the periphery of the roller 62 and extending longitudinally thereof are the opposed knives 64 which serve to sever the picks as they pass between said rollers. The roller 62 is driven through the medium of a sprocket wheel 65 on the shaft 66 thereof which receives the sprocket chain 37 that passes over the sprocket wheels 36 and 38. The size of the sprocket wheel 36 being half that of the sprocket wheels 38 and 65, it is evident that shaft 23 will make two revolutions to that of the feeding and severing rollers, the arrangement being such that a length of stock for two tooth-picks is fed into the machine by one revolution of the feed rollers, while the lower cutter heads are making two vertical reciprocations and the severing roller is making a single revolution, but is caused to sever two rows of picks by reason of the two knives carried in its periphery.

To carry the severed picks from the severing rollers a set of discharge rollers is employed suitably journaled in the rear of the severing rollers, and consisting of the upper rubber covered roller 67 and the lower roller 68 running in peripheral contact. Motion is transmitted to the roller 67 through the medium of an idle pinion 68ᵃ which meshes with a gear 69 on the shaft 66, and with a gear 70 on the shaft of roller 67. By this arrangement, motion is imparted to the roller 67 to cause it to engage and carry the tooth-picks from the severing rollers. To convey the tooth-picks from the first set of rollers that carry them from the severing rollers, a second set of rollers is employed which is journaled in the rear of the rollers 67 and 68 and consists of the upper rubber covered roller 71 and the lower roller 72 in peripheral contact therewith. These rollers 71 and 72 are driven at a higher rate of speed than rollers 67 and 68 through the medium of the large gear wheel 73 on the shaft of roller 67 which meshes with the pinion 74 on the shaft of roller 71, whereby the tooth-picks are carried quickly from the rollers 67 and 68. To take the picks from the rollers 71 and 72 and discharge them into a chute 75, a third set of rollers is employed journaled in the rear of the rollers 70 and 71 and consisting of the upper rubber covered roller 76 and the lower roller 77 in peripheral contact therewith. Motion is imparted to the roller 76 by means of the pinion 78 on the shaft of roller 71, which meshes with an idle gear 79 that in turn meshes with a pinion 80 upon the shaft of roller 76, which is driven at the same rate of speed as roller 71. From the rollers 76 and 77 the formed picks are discharged into the spout or chute 75 and conveyed to any suitable place for boxing. The distance between the centers of the sets of discharge rollers located in the rear of the severing rollers, is such that full length picks are carried on through the discharge rollers while broken picks or picks of the shorter length fall between said rollers, whereby said discharge rollers serve as means for assorting the picks, preventing the delivery of any short or broken picks into the spout or chute from the last set of rollers.

It will be understood that the heads carrying the cutters which form the picks are driven at a very high rate of speed independently of the reciprocatory movement of the lower heads, and of the movement of the feeding and severing mechanism. The rapid revolution of said heads and the interspacing of the knives therein, together with the shape of the cutting edges of said knives, cause said knives to form guide ways for the strands through which said strands pass while being shaped, and afford supports for said strands which hold the strands to the action of the knives upon opposite sides thereof during their passage between the knife carrying heads.

While it is preferable, as shown herein, to cause the lower heads to reciprocate in effecting a proper tapering of the picks, it is evident that the upper heads may be made to reciprocate, if desired, or that both heads may be made to move slightly toward and from each other to give to the picks the desired taper without departing from the spirit of our invention.

Having thus fully set forth our invention, what we claim as new and desire to secure by Letters Patent, is:—

1. In a machine for the purpose set forth, the combination with the strip feeding devices, of the rotary cutter heads having their axis of rotation in vertical alinement, interspaced shaping knives in said heads projecting from the peripheries thereof between which the stock strip is fed, the cutting edges of said knives in the opposed heads when acting upon said strip being interjacent and positioned to engage the opposite sides of the strip concurrently and the heels of said knives engaging and supporting the formed picks.

2. In a machine for the purpose set forth, the combination with the strip feeding devices, of the opposed rotary cutter heads arranged with their axis of rotation in vertical alinement, interspaced shaping knives in said heads projecting from the peripheries thereof between which the stock strip is fed, the cutting edges of said knives when acting upon said strip being interjacent and positioned to engage the opposite sides of the strip concurrently, and means for reciprocating one of the cutter heads in the direction of the axis of the other head.

3. In a machine for the purpose set forth, the combination with the strip feeding devices, of the rotary cutter heads in vertical alinement, interspaced shaping knives in said heads projecting from the peripheries thereof between which the stock strip is fed, the cutting edges of said knives when acting upon said strip being interjacent and positioned to engage the opposite sides of the strip concurrently, said shaping knives having bearing heels which support the formed picks, means for reciprocating a cutter head, and devices for severing the formed picks, said feeding and severing devices being operated synchronously with the reciprocation of the cutter head.

4. A machine for the purpose described, comprising devices for feeding the stock strips into the machine, rotary cutter heads arranged in vertical alinement, said heads having interspaced knives extending from their peripheries, the edges of said knives being provided with a series of cutters substantially semicircular in shape, having bearing heels in the rear of their cutting edges, said edges of the knives in the opposed heads when in working relation being interjacent to cause the bearing heels of the registering semicircular cutters therein to form guide channels for the severed strands.

5. In a machine for the purpose set forth, the combination of the rotary heads in superimposed relation, one of which is mounted to reciprocate in the direction of the axis of the other head, shaping knives in said heads, feeding devices for feeding a strip between said knives, severing devices for severing the formed picks, delivering devices operated from said severing devices and adapted to receive the picks from the severing devices, said delivering devices being arranged to receive and convey picks of a predetermined length only, an independently driven shaft, devices for reciprocating one of said heads mounted on said shaft, and means driven from said shaft for actuating the feeding and severing devices concurrently with said reciprocating devices.

6. In a machine for making tooth-picks, the combination with the feeding devices, of the rotary heads carrying the shaping knives between which the stock strip is fed, severing devices which sever the formed picks and a series of discharge rollers in the rear of the severing devices for delivering the formed picks from the machine, said rollers being arranged in pairs and so positioned as to receive only picks of a predetermined length.

7. In a machine for the purpose set forth, the combination of the rotary heads in superimposed relation, shaping knives set in said heads, feeding devices for feeding a strip between said knives, severing devices for severing the formed picks, and delivering devices to receive the picks from the severing devices, said delivering devices being arranged to receive and convey picks of a predetermined length only.

In testimony whereof, we sign this specification in the presence of two witnesses.

CHARLES R. EMENS.
WILLIS A. BROWER.

Witnesses:
E. S. HAMILTON,
S. S. WITHINGTON.